United States Patent
Vaknin et al.

(10) Patent No.: US 8,718,717 B2
(45) Date of Patent: May 6, 2014

(54) PUBLIC CELLULAR TELEPHONE CHARGING STATION

(76) Inventors: Orna Vaknin, Fresh Meadows, NY (US); Ravit Penias, Queens Village, NY (US)

(*) Notice: Subject to any disclaimer, the term of this patent is extended or adjusted under 35 U.S.C. 154(b) by 48 days.

(21) Appl. No.: 13/387,605

(22) PCT Filed: Jul. 30, 2009

(86) PCT No.: PCT/US2009/004392
§ 371 (c)(1),
(2), (4) Date: Jan. 27, 2012

(87) PCT Pub. No.: WO2011/014142
PCT Pub. Date: Feb. 3, 2011

(65) Prior Publication Data
US 2012/0129577 A1    May 24, 2012

(51) Int. Cl.
*H04B 1/38* (2006.01)

(52) U.S. Cl.
USPC ............ 455/573; 455/343.1; 455/343.5; 455/343.6

(58) Field of Classification Search
USPC ......... 455/573, 574, 343.1–343.6; 705/14.37, 705/16–25
See application file for complete search history.

(56) References Cited

U.S. PATENT DOCUMENTS

| | | |
|---|---|---|
| 4,753,387 A | 6/1988 | Fee et al. |
| 4,829,429 A | 5/1989 | Komai et al. |
| 4,937,744 A | 6/1990 | Ball |
| 5,744,933 A | 4/1998 | Inoue et al. |
| 5,875,521 A | 3/1999 | Woo |
| 5,917,675 A | 6/1999 | Yang |
| 5,924,079 A | 7/1999 | Brown |
| 5,932,989 A | 8/1999 | Thandiwe et al. |
| 6,337,558 B1 | 1/2002 | Yuen et al. |
| 6,427,074 B1 | 7/2002 | Chavez, Jr. et al. |
| 6,463,305 B1 | 10/2002 | Crane |
| 6,830,160 B2 | 12/2004 | Risolia |
| 7,303,440 B2 | 12/2007 | Stull et al. |
| 7,490,758 B2 | 2/2009 | Drummond et al. |

(Continued)

FOREIGN PATENT DOCUMENTS

| | | |
|---|---|---|
| GB | 2344680 A * | 6/2000 |
| GB | 2345595 | 7/2000 |

(Continued)

OTHER PUBLICATIONS

Translation of the description part for JP2003230229.*

*Primary Examiner* — Allahyar Kasraian
(74) *Attorney, Agent, or Firm* — Richard C. Litman

(57) ABSTRACT

The public cellular telephone charging station (10) is a publicly accessible charging system for cellular telephones and other portable devices. The charging station (10) includes a housing (12) and a support (14) for supporting the housing (12) on a support surface. At least one receptacle (16) is provided within the housing (12) for receiving at least one cellular telephone (C) to be charged. Circuits (100), which include a timer (106), are disposed within the housing (12). A charging system for charging the at least one cellular telephone is further provided, with the charge time being calculated by the circuits (100) and being measured and controlled by the timer (106). At least one charging port (18, 20, 22) is located within the at least one receptacle (16) for releasable connection to, and charging of, the at least one cellular telephone (C).

15 Claims, 8 Drawing Sheets

(56) References Cited

U.S. PATENT DOCUMENTS

| | | |
|---|---|---|
| 7,490,760 B1 | 2/2009 | Brausch et al. |
| 7,542,945 B2 | 6/2009 | Thompson et al. |
| 2003/0025476 A1 | 2/2003 | Trela |
| 2003/0034757 A1 | 2/2003 | Woodnorth |
| 2004/0155631 A1 | 8/2004 | Ishizu |
| 2006/0229112 A1* | 10/2006 | Forro .................. 455/573 |
| 2007/0279002 A1* | 12/2007 | Partovi ................ 320/115 |
| 2008/0164841 A1 | 7/2008 | Nam |
| 2009/0014460 A1* | 1/2009 | Kobus et al. ......... 221/135 |
| 2009/0119177 A1 | 5/2009 | John et al. |
| 2010/0106631 A1* | 4/2010 | Kurayama et al. ...... 705/34 |
| 2010/0228687 A1* | 9/2010 | Lewis, Jr. ............. 705/412 |
| 2011/0316478 A1* | 12/2011 | Lowenthal et al. ..... 320/109 |

FOREIGN PATENT DOCUMENTS

| | | |
|---|---|---|
| JP | 10-304579 | 11/1998 |
| JP | 2003-196735 | 7/2003 |
| JP | 2003-230229 | 8/2003 |
| JP | 2004-072193 | 3/2004 |
| JP | 2007193732 A * | 8/2007 |
| JP | 2007-312509 | 11/2007 |
| KR | 10-0726757 | 6/2007 |
| WO | WO 2008096861 A1 * | 8/2008 |

* cited by examiner

PUBLIC CELLULAR TELEPHONE CHARGING STATION

TECHNICAL FIELD

The present invention relates to chargers for portable electronic devices, and particularly to a public cellular telephone charging station that provides a publicly accessible universal charging station for cellular telephones, regardless of make or model.

BACKGROUND ART

Portable electronic devices, particularly cellular telephones, are widely used. Electronic device users often employ a spare auxiliary battery to replace the original device battery in the event of battery discharge or failure. If an auxiliary battery is not available, the device with the discharged battery must be recharged with an exterior charger or hands-free vehicle kit charger. Few device users carry auxiliary batteries. Thus, recharging of the primary battery is the only option for maintaining proper power levels for operation of the device. Since a conventional charger generally utilizes alternating current, typically either 110 V or 220 V "household" current, which is designed for indoor use, it is difficult to recharge a battery in a public place or while traveling without access to a suitable power terminal. Further, such charging would require the user to also be traveling with a charger, which may be inconvenient or easily forgotten. Similarly, in a vehicle, the user must have his or her charger available (particularly, a charger that is adapted for the specific device brand and model) in order to use the vehicle's electrical power supply. Thus, a public cellular telephone charging station solving the aforementioned problems is desired.

DISCLOSURE OF INVENTION

The public cellular telephone charging station is a publicly accessible charging system for cellular telephones and other portable devices. The charging station may be kiosk-style, and located on a sidewalk, within a building lobby, or in any other suitable publicly accessible location, such as those typically associated with public telephones. The charging station includes a housing having an open interior region defined therein. At least one receptacle is provided within the housing for receiving at least one cellular telephone to be charged.

A controller, which may be any type of logic controller, computer or the like, and which includes a timer or timing circuit, is disposed within the housing. A charging system for charging the cellular telephone is further provided. The charging system includes a suitable subsystem for measuring the battery charge of the cell phone battery and a suitable subsystem for calculating the charge time of the battery. The charge time is preferably calculated by the controller and is measured and controlled by the timer.

At least one charging port is disposed within the at least one receptacle for releasable connection to, and for charging of, the at least one cellular telephone. The at least one charging port is in communication with the controller and the charging system. A graphical user interface (GUI) is further provided. The GUI interface is in communication with the controller and is mounted to the housing. A system for receiving and authenticating user identification and security information entered via the graphical user interface is also provided. The identification and security system is in communication with the controller. Similarly, a system for processing payment for charging of the at least one cellular telephone for a selected time period is provided. The payment system is also in communication with the controller. A network interface, such as an Internet interface, local area network interface, wide area network interface, or the like is also provided. The interface is in communication with the controller and with the authentication system.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODES FOR CARRYING OUT THE INVENTION

Figure 1:
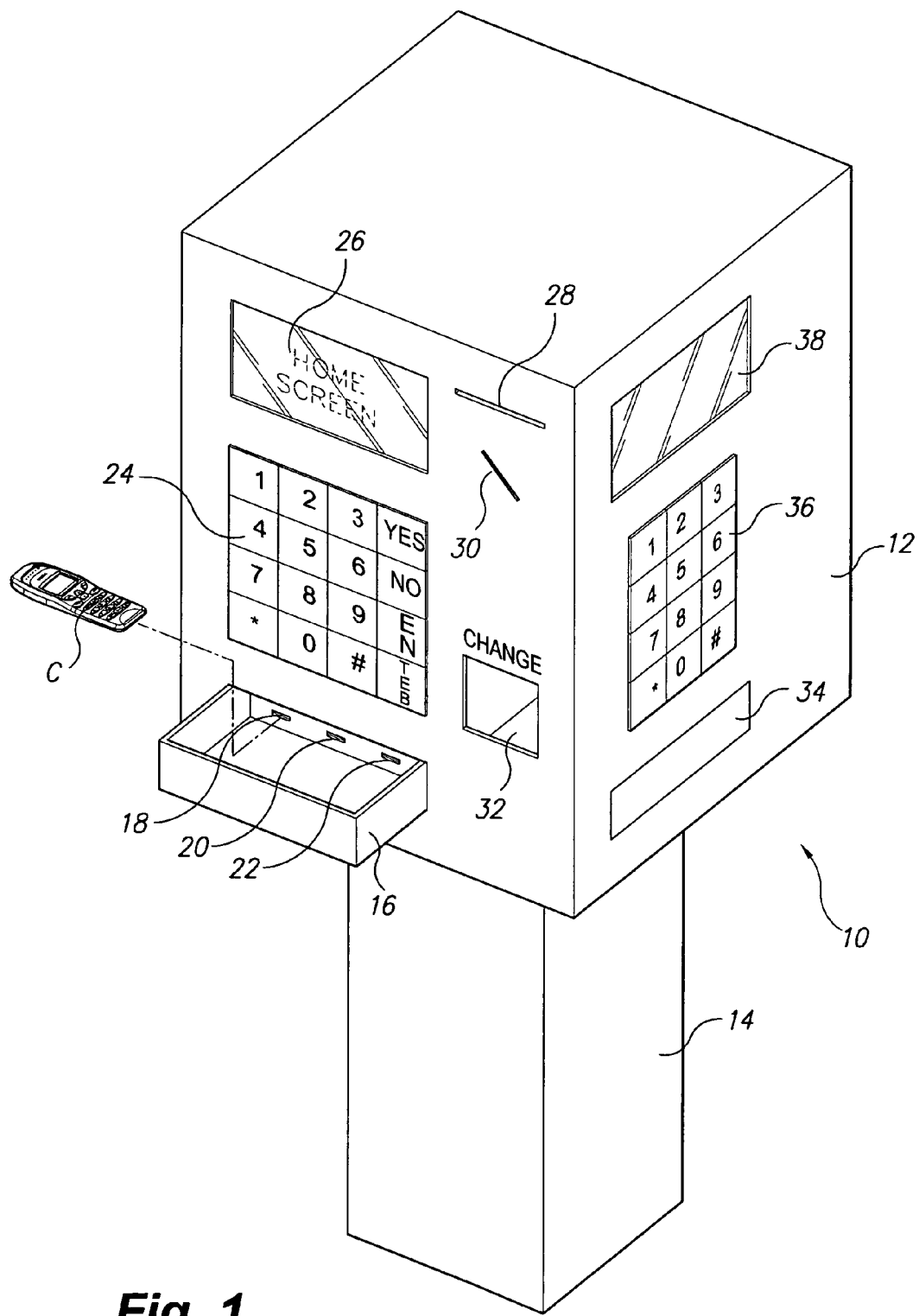
FIG. 1 is a perspective view of a public cellular telephone charging station according to the present invention.

As best shown in FIG. 1, the public cellular telephone charging station 10 is a publicly accessible and located charging system for cellular telephones and other portable devices, such as the exemplary cellular telephone C. Station 10 may be located on a sidewalk, within a building lobby or in any other suitable publicly accessible location, such as those typically associated with public telephones, and may be a kiosk-style station. Station 10 includes a housing 12 mounted on a support 14. It should be understood that housing 12 and support 14 may have any desired dimension or configuration, depending upon the particular location of the station 10, and that the overall design of station 10 is shown in FIG. 1 is for exemplary purposes only. Housing 12 may be formed from any desired material, but is preferably water-resistant and secure against vandalism and environmental damage.

A user interface, such as exemplary keypad 24, is mounted to housing 12, allowing the user to initiate charging. Coupled with a display 26, the user is provided with instructions and options for charging of cellular telephone C. In use, the user initiates the charging procedure by entry on keypad 24, and is offered the option of charging cellular telephone C for a selected period of time or until the telephone C is fully charged. The cost of charging is presented to the user on the display 26, along with instructions for use. The user may pay by credit or debit card, or by a pre-paid card, through insertion of the appropriate card in slot 28, or in cash by inserting coins or paper currency in slot 30, or by any other suitable type of payment, such as electronic transfer from a bank account or line of credit, either initiated by entry of identification information on keypad 24 or through the cellular telephone C. Change is provided to the user by a change slot 32. Such payment and transaction methods and systems are well known in the art of public telephones, and any suitable payment and/or transaction system may be used in the station 10. As shown, multiple sets of interfaces and charging drawers, such as additional keypad 36, display 38 and drawer 34, may be provided, allowing multiple users to use a single charging station, or a single user to charge multiple telephones simultaneously. It should be understood that any suitable type of graphical user interface may be utilized for the display 26, including a touch screen LCD, which might eliminate the need for a separate or discrete keypad 24.

Figure 2:
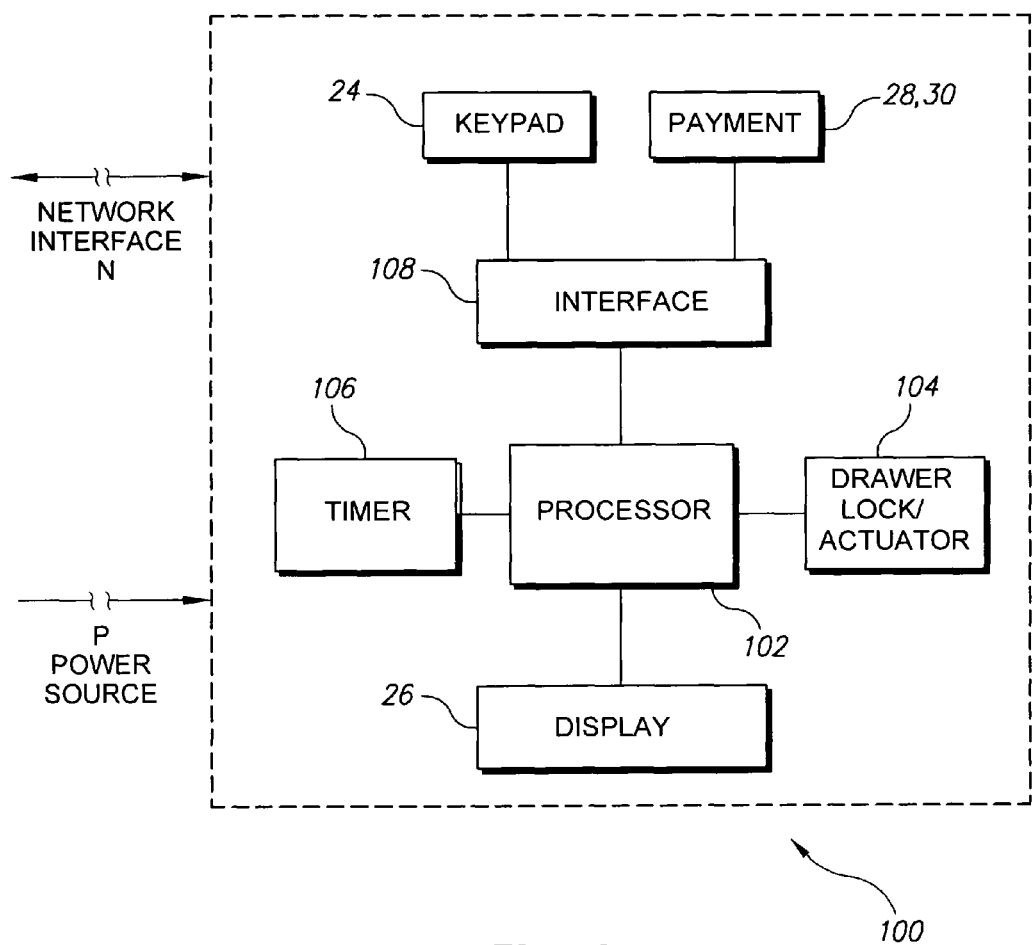
FIG. 2 is a block diagram of circuitry for the public cellular telephone charging station according to the present invention.

As shown in FIG. 2, the circuits 100 for the station 10 (which may be consolidated on a single microcontroller, programmable logic controller, application specific integrated circuit, or other integrated circuit) include a processor 102 in communication with interface 108, which may be in the form of keypad 24, payment slots 28, 30 or any other suitable interface, and display 26. Display 26 may be any suitable type of graphical display device, such as a liquid crystal display or the like. A timer or timing circuit 106 is in communication with processor 102 for providing timing signals. Upon initiation of the charging procedure the processor 102 actuates an electronic lock or other actuator 104, unlocking and opening a drawer 16. Within drawer 16 are charging ports 18, 20, 22 (it should be understood that the number, positioning and type of ports shown in FIG. 1 are shown for exemplary purposes only). The user connects cellular telephone C to one of the charging ports and the processor 102 actuates actuator 104 to close and lock drawer 16 for the calculated or entered charging time. Once the telephone C is charged, either fully or for the desired charging time, the drawer 16 is unlocked and opened again, and the user may take his or her telephone. In order to unlock the drawer 16, the user preferably enters security and identification information, as will be described below.

Processor 102 may be in communication with a local area network (LAN) or wide area network (WAN) through a network interface N, which may be a conventional Internet interface or the like. Rather than paying for charging by currency or credit/debit card, the user may use keypad 24 to enter identification information, such as the ten-digit phone number associated with the cellular telephone, to access a payment account over the network. Any suitable type of identification and security method may be used, such as biometric security systems, password entry, or the like. Any desired payment scheme may be used. For example, a price may be set for a standard charging period, such as twenty minutes, or a price may be calculated based upon a calculated length of time for fully charging the cellular telephone or other device. Additionally, service charges and the like may be applied, with all relevant information being provided to the user on the display. The network interface N may access a user's bank account, line of credit or the like, or an account specifically designated for charging of the telephone C by the station 10.

Figure 6:
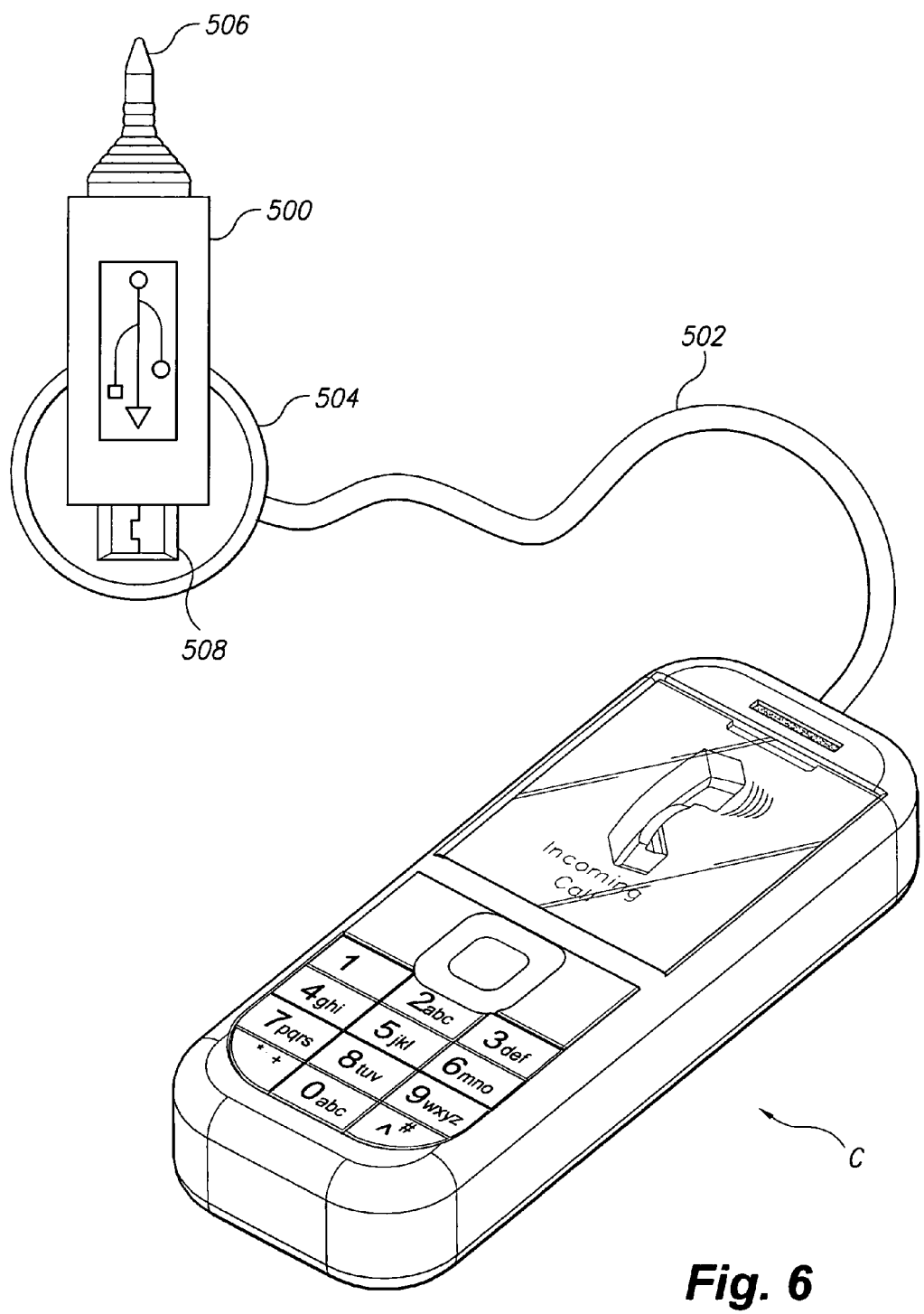
FIG. 6 is a perspective view of a universal charging adapter for a public cellular telephone charging station according to the present invention.

Ports 18, 20, 22 may each be a unique type of charging port, dedicated for a particular make or model of cellular telephone or other portable device, or may each be a universal charging port. FIG. 6 illustrates an exemplary cellular telephone C with a universal charging adapter 500 attached thereto by a tether 502 and a key ring 504. It should be understood that tether 502 and ring 504 are shown for exemplary purposes only. Universal adapters are well known, and adapter 500 may be any suitable conventional adapter, having a first plug 506 adapted for insertion into the charging port of telephone C and having a second plug 508 adapted for insertion into a universal charging port within drawer 16. Preferably, the display 26 provides the user with an indication that the telephone C has been properly connected. Power for station 10, and for charging cellular telephone C, is provided by any suitable source of power P, such as the municipal power supply.

Battery charging systems, including universal charging adapters and systems for sensing and managing battery charge for cellular telephones and similar devices are well known in the art. Examples of such systems are shown in U.S. Pat. Nos. 5,932,989; 7,303,440; 6,463,305; 6,427,074; and 6,337,558, each of which is herein incorporated by reference in its entirety. Additionally, drawers, doors, associated actuators and the like for automatic teller machines, cash registers and similar systems, including security measures, are well known in the art. Examples of such systems are shown in U.S. Pat. Nos. 7,490,760; 7,490,758; 7,542,945; 4,753,387; 5,924,079; 4,937,744; and 4,829,429, each of which is herein incorporated by reference in its entirety. Additionally, kiosks and the like capable of receiving multiple types of payment are well known in the art. One such example is shown in U.S. Pat. No. 6,830,160, which is herein incorporated by reference in its entirety.

Figure 3:
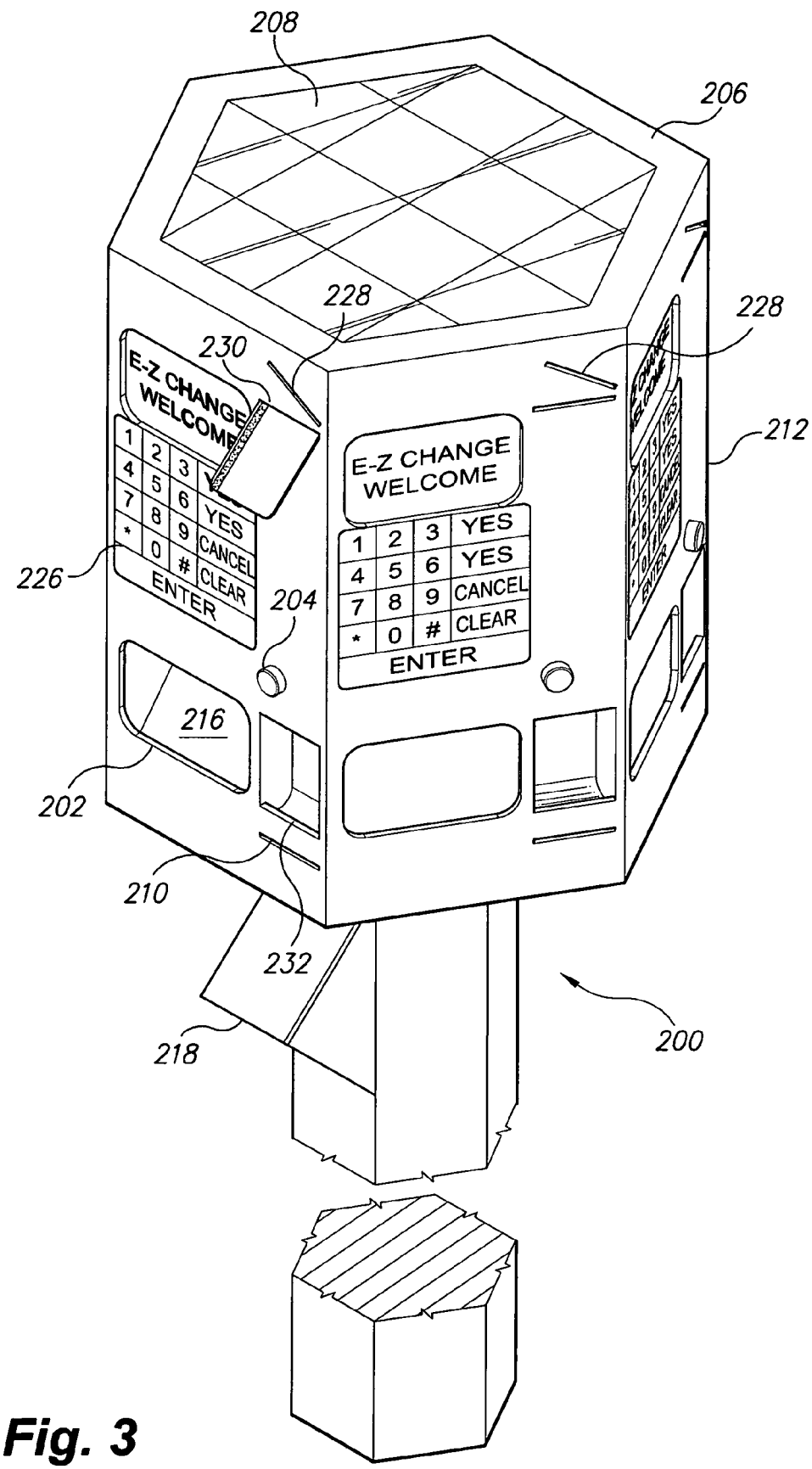
FIG. 3 is a perspective view of an alternative embodiment of a public cellular telephone charging station according to the present invention.

Charging station 200, shown in FIG. 3, is similar to that described above with regard to FIGS. 1 and 2. The charging station 200 includes a housing 212 mounted on a post, pedestal, or column. As noted above, the housing and support of the charging station may have any desired dimension or configuration. In FIG. 3, the housing 212 has a hexagonal configuration. A waste receptacle 218 may be mounted on or within the post 214, allowing for the disposal of broken telephones, receipts and the like. The station 200 provides paper receipts, if desired, through a receipt slot 210. As in FIG. 1, the user may pay using coins or paper currency in slot 228, or by credit or debit card using slot 230. Change is provided to the user through coin slot 232, with a manual change button 204 being provided, as is conventionally known. Rather than having separate keypads and displays, station 200 includes a touch screen 226, allowing the user to enter, input, and receive visual output generated by the control circuits 100. Rather than a drawer 16 that slides out to receive telephone C, as in FIG. 1, a door 216 covers a slot or compartment 202 for receiving the telephone. The slot 202 behind door 216 is locked by any suitable locking actuator under control of the processor 102, as described above. In use, the user inserts telephone C into the slot or compartment 202 through hinged door 216 in a manner similar to a videocassette tape being inserted into a video cassette recorder (VCR), as is conventionally known. In a conventional videocassette recording device, the inserted videotape is locked in place and moved against a magnetic read head. Upon insertion of telephone C into the slot or compartment 202, the telephone C is grasped and locked in place and the plug of a charging port is connected to the telephone C. One such door is shown in U.S. Pat. No. 5,875,521, and one such internal carrier system is shown in U.S. Pat. No. 5,917,675, each of which are hereby incorporated by reference in their entirety. Any suitable system for such connection may be used, as is conventionally known in the art of videocassette recording devices and the like.

The charging port may be a universal charging port with an adapter, if needed, as described above with reference to FIG. 6, or a scanner may be utilized for determining the particular type of adapter needed. For example, an optical scanner may be mounted within housing 212, and when telephone C is inserted therethrough, the scanner scans the outer surface of the telephone C and matches the scanned charging port with the appropriate charging adapter. As shown in FIG. 3, rather than being connected to a municipal power supply, station 200 has a solar panel 208 mounted on an upper wall 206 thereof to provide power to the entire system. Solar panel 208 may directly power the system, or may be connected to a storage battery mounted within housing 212.

Figure 4:
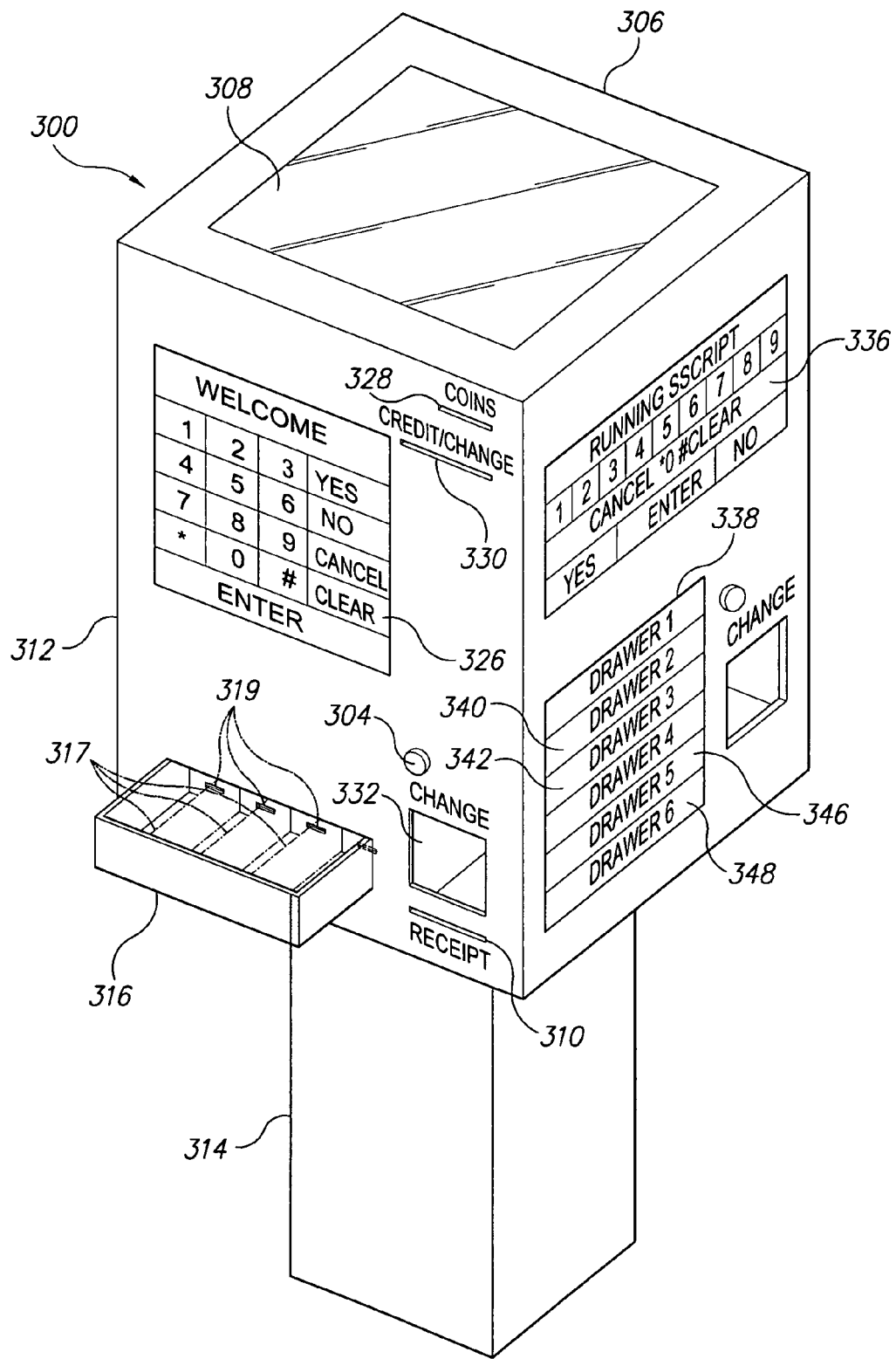
FIG. 4 is a perspective view of another alternative embodiment of a public cellular telephone charging station according to the present invention.

Charging station 300 of FIG. 4 is similar to that described above with regard to FIGS. 1 and 2 and station 200 of FIG. 3. The charging station 300 includes a housing 312 mounted on a post, column, pedestal, or other support 314. As in FIG. 1, the user may pay by coins or paper currency using slot 328, or by credit or debit card using slot 330. Change is provided to the user by coin slot 332. A manual change button 304 is provided, as is conventionally known, and a receipt, if desired, is produced by receipt slot 310. Rather than having separate keypads and displays, station 300 includes a touch screen 326, allowing the user to enter, input, and receive visual output generated by the control circuitry. A first drawer 316 is provided, similar to drawer 16, but being divided into separate compartments by a plurality of dividers or internal walls 317. Each compartment has a charging port 319 associated therewith, allowing the user to charge multiple cellular telephones within one drawer simultaneously. Charging ports 319 may be universal ports, as described above, or may each have a unique configuration, adapted for charging different brands and models of telephone.

As in the embodiment of FIG. 3, station 300 is powered, at least in part, by a solar panel 308 mounted on an upper wall 306 of housing 312. In FIG. 1, multiple interfaces and drawers are provided on separate faces of housing 12. However, the interfaces and drawers are identical. In station 300 of FIG. 4, a similar touch screen 336 is provided on a second face of housing 312, but a bank of multiple drawers 338, 340, 342, 344, 346 is provided. Rather than having a single drawer 316 divided into multiple compartments, the multiple drawers 338, 340, 342, 344, 346 serve the same function; i.e., allowing the user to charge multiple cellular telephones simultaneously. In order to provide further charging options, each of drawers 338, 340, 342, 344, 346 may similarly be divided into multiple compartments.

Figure 5:
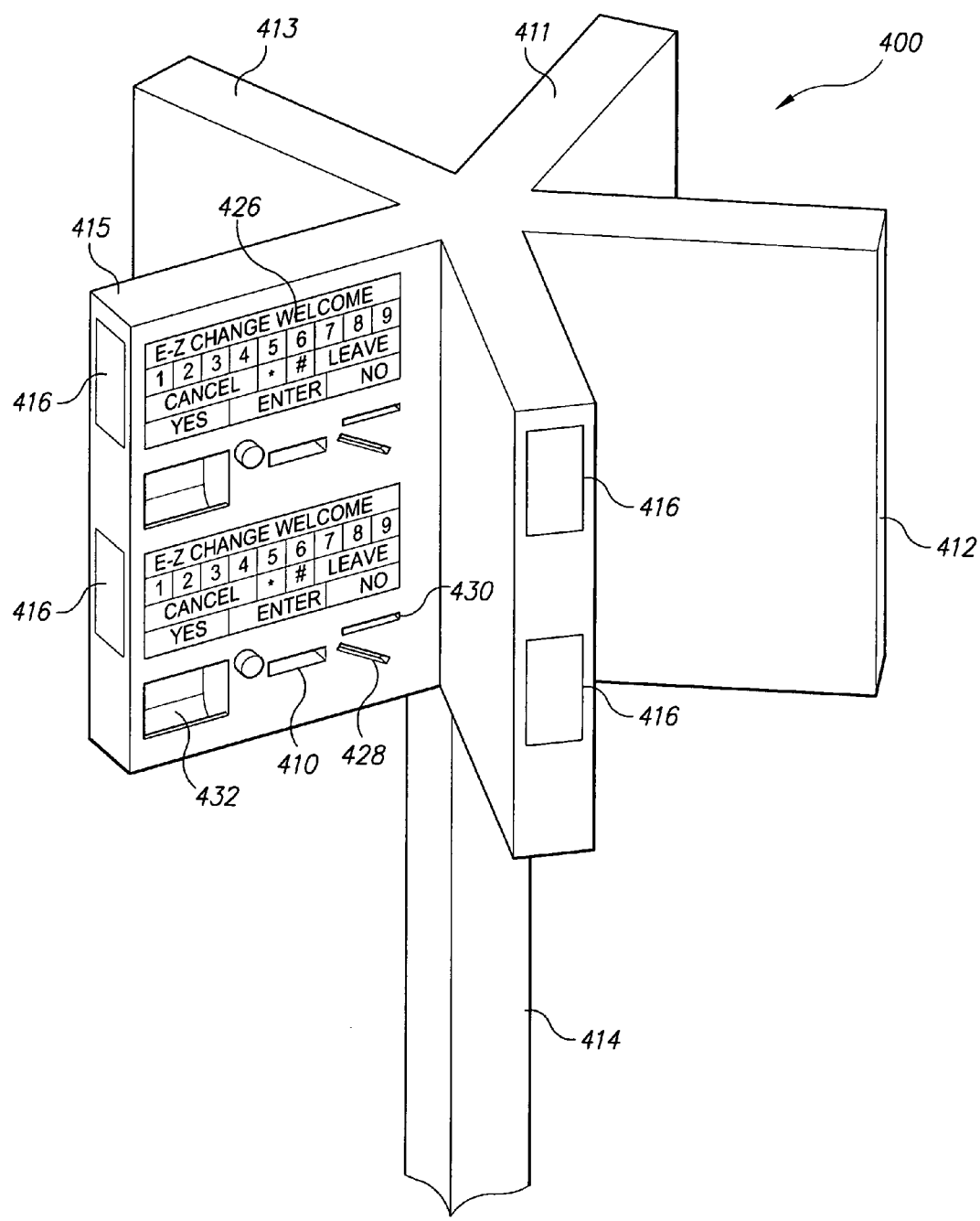
FIG. 5 is a perspective view of another alternative embodiment of a public cellular telephone charging station according to the present invention.

Rather than providing multiple charging sites and interfaces on separate faces of a single housing, station 400 of FIG. 5 provides a plurality of radially extending walls 411, 412, 413, 415 concentrically or coaxially mounted on a single support 414. Each wall includes a touch screen interface 426, a currency slot 428, a credit or debit card slot 428, a receipt slot 410 and a change slot 432, as described above, with telephones being inserted through doors 416, as described above.

Figure 7:
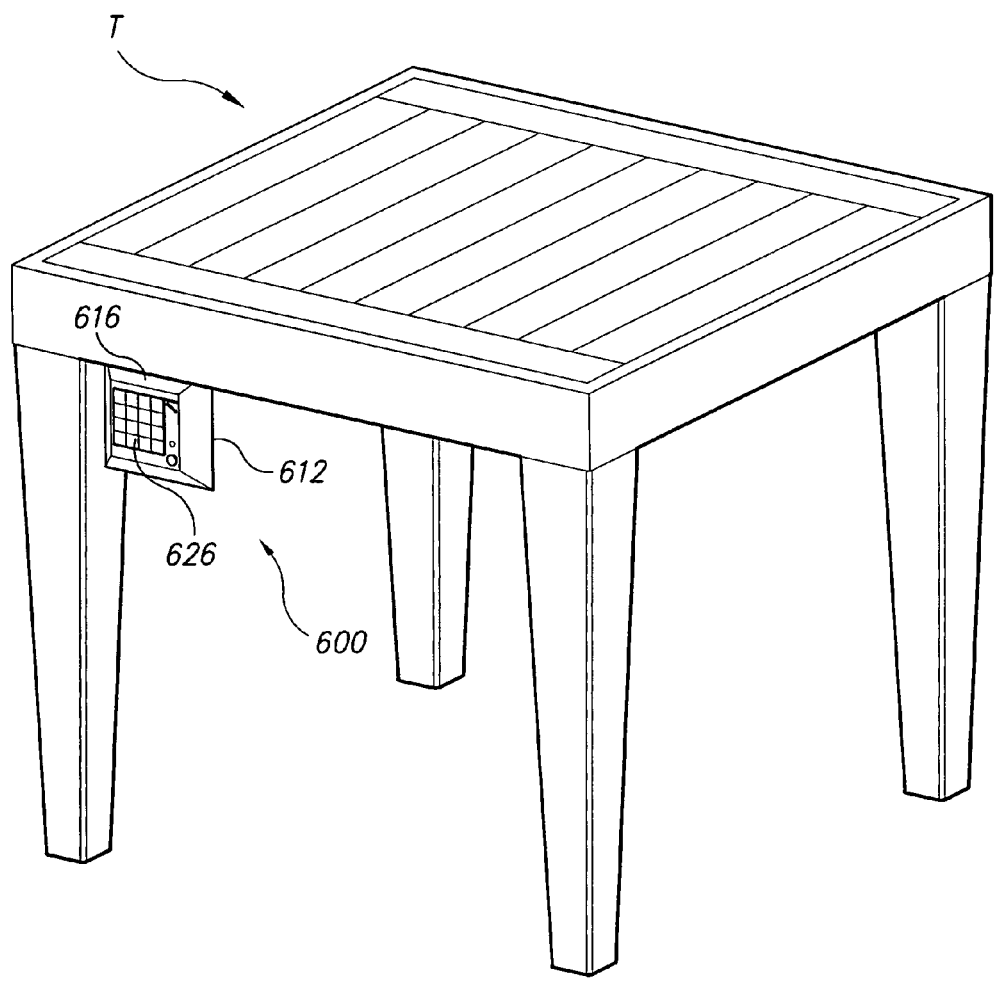
FIG. 7 is an environmental, perspective view of another alternative embodiment of a public cellular telephone charging station according to the present invention.
Figure 8:
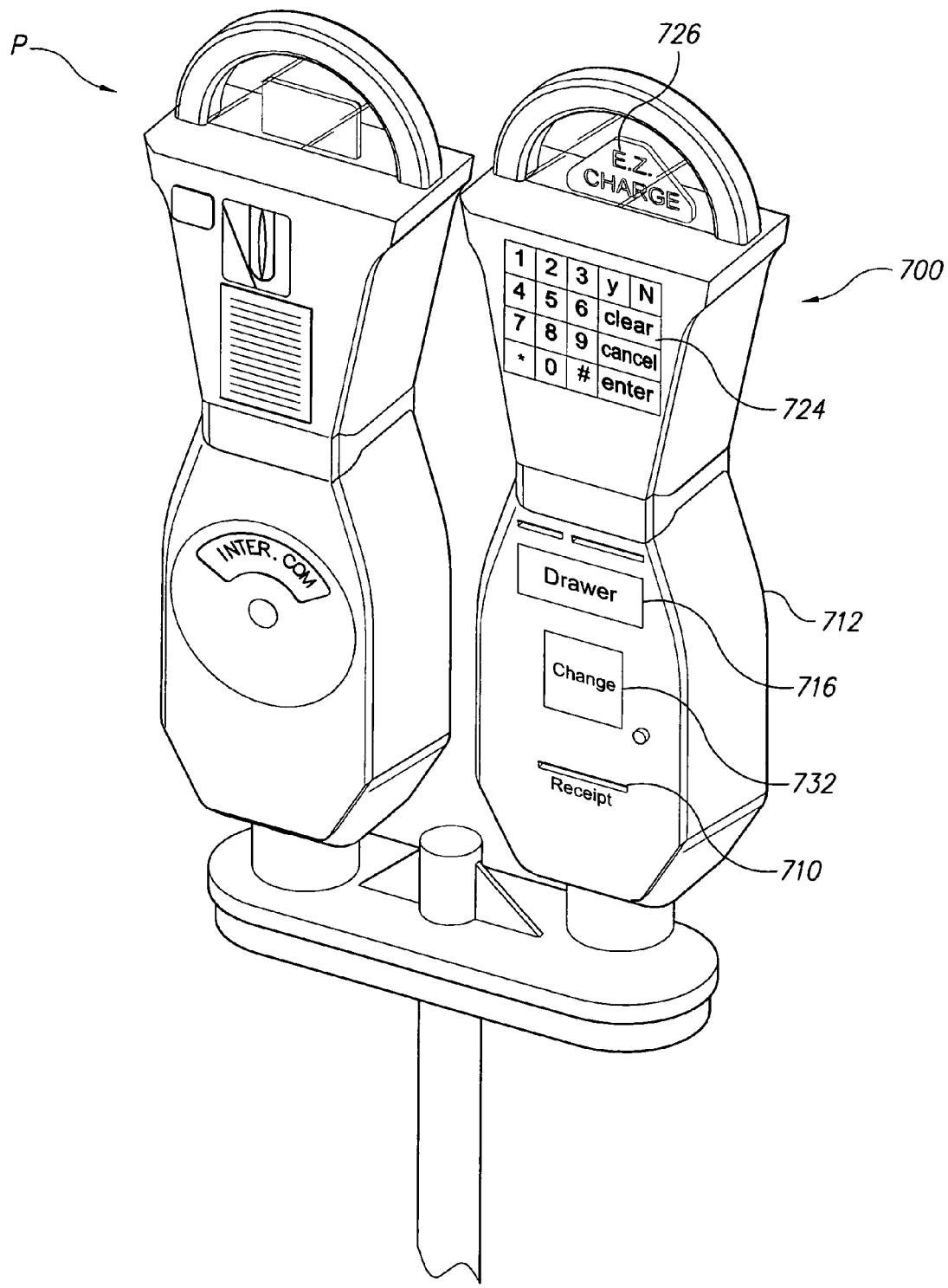
FIG. 8 is an environmental, perspective view of another alternative embodiment of a public cellular telephone charging station according to the present invention.

Rather than being freestanding units, the charging stations may be integrated into other structures. For example, in FIG. 7, a charging station 600 is mounted to a table T, which may be located in a restaurant or the like. Charging station 600 includes housing 612, a touch screen interface 626 and a slot 616 for receiving a cellular telephone C, and operates in a manner similar to that described above. In another embodiment, charging station 700 of FIG. 8 is mounted next to a parking meter P, forming part of an integrated parking meter unit. Charging station 700 includes housing 712, a keypad 724, a display 726, a change slot 732, a receipt slot 710 and a drawer 716 for receiving cellular telephone C, and operates in a manner similar to that described above.

It should be understood that the embodiments shown above are shown for exemplary purposes only, and that the public cellular telephone charging station may have any desired configuration or placement. For example, rather than being mounted on a post or the like, as described above, the station could be wall-mounted, or embedded in a wall, as is known in the fields of automatic teller machines, vending machines and the like. The station may have any desired configuration, dimensions, contouring, placement or mounting, without department from the spirit or the scope of the claims.

It is to be understood that the present invention is not limited to the embodiments described above, but encompasses any and all embodiments within the scope of the following claims.

The invention claimed is:

1. A public cellular telephone charging station, comprising:
   a housing having an open interior region defined therein;
   a support, the housing being mounted on the support;
   at least one receptacle disposed in the housing for receiving at least one cellular telephone to be charged;
   a control circuit disposed in the housing, the circuitry including a timer;
   a charging circuit disposed in the housing for charging the at least one cellular telephone, the charging circuit being electrically connected to the control circuit;
   a plurality of unique charging ports and charging adapters disposed in the at least one receptacle for connection of the at least one cellular telephone thereto and being electrically connected to the charging circuit
   a display for indicating the at least one cellular telephone has been properly electrically connected;
   at least one scanner mounted within the housing for scanning the outer surface of the at least one cellular telephone and matching it with the appropriate charging adapter;
   a graphical user interface in communication with the control circuit, the graphical user interface being disposed on the housing;
   means for processing payment for charging of the at least one cellular telephone for a selected time period, the means for processing payment being in electrical communication with the control circuit; and
   a network interface in electrical communication with the control circuit.

2. The public cellular telephone charging station as recited in claim 1, wherein said receptacle comprises a drawer slidably disposed in the housing for receiving the cellular telephone, the station further comprising means for selectively locking and releasing the drawer, the means for locking and receiving being in electrical communication with said control circuit.

3. The public cellular telephone charging station as recited in claim 2, wherein the drawer is divided into a plurality of compartments, each of the compartments having a separate said charging port positioned therein.

4. The public cellular telephone charging station as recited in claim 1, further comprising:
   at least one door releasably covering and sealing the at least one receptacle; and
   means for selectively locking and releasing the at least one door, the means for locking and releasing being in communication with said control circuit.

5. The public cellular telephone charging station as recited in claim 4, further comprising means for holding the at least one cellular telephone within the at least one receptacle and positioning the at least one charging port against a charging input of the at least one cellular telephone, the means for holding the at least one cellular telephone being in communication with said control circuit.

6. The public cellular telephone charging station as recited in claim 1, further comprising at least one solar panel mounted on said housing, the solar panel being electrically connected to said control circuit for providing electrical power thereto.

7. The public cellular telephone charging station as recited in claim 1, further comprising at least one universal charging adapter connected to the at least one charging port, the adapted being configured for connecting the at least one cellular telephone to the at least one charging port.

8. The public cellular telephone charging station as recited in claim 1, further comprising means for receiving user identification and security information entered through said graphical user interface.

9. The public cellular telephone charging station as recited in claim 8, further comprising means for authenticating the user identification and security information.

10. The public cellular telephone charging station as recited in claim 1, further comprising means for presenting instructional information to the user on said graphical user interface.

11. The public cellular telephone charging station as recited in claim 1, further comprising means for measuring a battery charge of a battery of the at least one cellular telephone.

12. The public cellular telephone charging station as recited in claim 11, further comprising means for calculating a charge time of the battery.

13. The public cellular telephone charging station as recited in claim 12, further comprising means for alerting the user that the battery has been charged.

14. A public cellular telephone charging station, comprising:

a housing having an open interior region defined therein;
a support, the housing being mounted on the support;
at least one receptacle disposed in the housing for receiving at least one cellular telephone to be charged;
a control circuit disposed in the housing, the circuitry including a timer;
a charging circuit disposed in the housing for charging the at least one cellular telephone, the charging circuit being electrically connected to the control circuit;
at least one charging port and charging adapter disposed in the at least one receptacle for connection of the at least one cellular telephone thereto and being electrically connected to the charging circuit;
a display for indicating the at least one cellular telephone has been properly electrically connected;
at least one scanner mounted within the housing for scanning the outer surface of the at least one cellular telephone and matching it with the appropriate charging adapter;
a graphical user interface in communication with the control circuit, the graphical user interface being disposed on the housing;
means for processing payment for charging of the at least one cellular telephone for a selected time period, the means for processing payment being in electrical communication with the control circuit; and
a network interface in electrical communication with the control circuit.

15. The public cellular telephone charging station as recited in claim 14, further comprising at least one universal charging adapter connected to the at least one charging port, the adapted being configured for connecting the at least one cellular telephone to the at least one charging port.

* * * * *